United States Patent
Shen et al.

(10) Patent No.: US 9,812,961 B2
(45) Date of Patent: Nov. 7, 2017

(54) DIRECT CURRENT CONVERSION DEVICE AND OPERATION METHOD OF THE SAME

(71) Applicant: DELTA ELECTRONICS, INC., Taoyuan (TW)

(72) Inventors: Guo-Qiao Shen, Taoyuan (TW); Yu-Ming Chang, Taoyuan (TW); Jin-Fa Zhang, Taoyuan (TW); Guo-Jin Xu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/080,603

(22) Filed: Mar. 25, 2016

(65) Prior Publication Data
US 2016/0308433 A1    Oct. 20, 2016

(30) Foreign Application Priority Data
Apr. 17, 2015    (CN) .......................... 2015 1 0184329

(51) Int. Cl.
*H02M 3/158* (2006.01)
*H02M 1/00* (2006.01)

(52) U.S. Cl.
CPC ...... *H02M 3/158* (2013.01); *H02M 2001/008* (2013.01); *H02M 2001/0074* (2013.01)

(58) Field of Classification Search
CPC .... H02M 3/156–3/158; H02M 3/1584; H02M 3/285; H02M 1/083; H02M 5/293; G05F 1/34; G05F 1/56; G05F 1/62; G05F 3/18; G05F 3/22; G05F 3/56

USPC ..... 323/207, 222, 234, 235, 311; 363/65, 68
See application file for complete search history.

(56) References Cited

U.S. PATENT DOCUMENTS

| | | | | |
|---|---|---|---|---|
| 8,854,021 B2* | 10/2014 | Saito | .................. | H02M 3/1584 323/272 |
| 9,106,201 B1* | 8/2015 | Chakraborty | ........ | H02M 3/1584 |
| 2013/0009700 A1* | 1/2013 | Deboy | ..................... | H02J 3/383 327/581 |
| 2016/0179114 A1* | 6/2016 | Kim | ........................ | H03F 1/303 323/281 |

* cited by examiner

*Primary Examiner* — Yemane Mehari
(74) *Attorney, Agent, or Firm* — CKC & Partners Co., Ltd.

(57) ABSTRACT

A DC conversion device including a first DC converter and a second DC converter connected in series, a voltage difference adjusting unit, and a first and a second control unit is provided. The first and the second DC converter respectively receive a first and a second input current to generate a first output current and a first output voltage, a second output current and a second output voltage at a first and a second output end connected to a first and a second energy-storing element, respectively. The voltage difference adjusting unit generates a voltage difference adjusting signal. The first control unit generates a first control signal to control the first converter. The second control unit generates a second control signal according to the voltage difference adjusting signal to control the second converter to balance the first and the second input and output voltages.

20 Claims, 9 Drawing Sheets

DIRECT CURRENT CONVERSION DEVICE AND OPERATION METHOD OF THE SAME

RELATED APPLICATIONS

This application claims priority to China Application Serial Number 201510184329.2, filed Apr. 17, 2015, which is herein incorporated by reference.

BACKGROUND

Field of Invention

The present invention relates to a direct current conversion technology. More particularly, the present invention relates to a direct current conversion device and an operation method of the same.

Description of Related Art

Direct current (DC) power conversion is used to convert the DC electric energy between different voltage levels. In many applications, a multiple of series-connected DC conversion circuits or DC conversion modules are used to lower the voltage level of each power conversion circuit. When the DC input ends or the DC output ends of the multiple of DC conversion circuits are coupled in series, the DC input end or the DC output end of each of the DC conversion circuits has to be controlled within a predetermined voltage range to avoid the protective shut-down of the power conversion circuit or the damage of the circuit components due to the voltage that exceeds the limit. However, the implementation and the effect of the control method may vary with the circuit configuration and the operation condition, and may be related to the cost and efficiency of the converter circuit.

When a multiple of energy storing elements are used in the energy storing system such as batteries and capacitors, the storing capacity can be fully used when the charging and discharging energy matches the capacity of each of the energy storing units.

SUMMARY

One aspect of the invention provides a direct current (DC) conversion device. The conversion device includes a first DC converter, a second DC converter, a voltage difference adjusting unit, a first control unit and a second control unit. The first DC converter includes a first input end to receive a first input current and a first input voltage, and a first output end to generate a first output current and a first output voltage, wherein the first output end is electrically coupled to a first energy storing element. The second DC converter includes a second input end to receive a second input current and a second input voltage, and a second output end to generate a second output current and a second output voltage, wherein the second output end is electrically coupled to a second energy storing element. The voltage difference adjusting unit is electrically coupled to the first DC converter and the second DC converter to generate a voltage difference adjusting signal. The first control unit generates a first control signal to control the first DC converter. The second control unit generates a second control signal to control the second DC converter to balance the first output voltage and the second output voltage according to the voltage difference adjusting signal.

Yet another aspect of the present invention is to provide a DC conversion device. The conversion device includes a first DC converter, a plurality of second DC converters, a plurality of voltage difference adjusting units, a first control unit and a plurality of second control units. The first DC converter includes a first input end to receive a first input current and a first input voltage, and a first output end to generate a first output current and a first output voltage, wherein the first output end is electrically coupled to a first energy storing element. Any one of the second DC converters includes a second input end to receive a second input current and a second input voltage, and a second output end to generate a second output current and a second output voltage, wherein the second input ends of the plurality of second DC converters are electrically coupled to the first input end in series, and the second output ends of the plurality of second DC converters are electrically coupled to a plurality of second energy storing elements respectively. The voltage difference adjusting units are electrically coupled to the first DC converter and the second DC converters to generate a plurality of voltage difference adjusting signals. The first control unit generates a first control signal to control the first DC converter. Any one of the second control units generates a corresponding second control signal to control the corresponding second DC converter according to the corresponding voltage difference adjusting signal to balance the first output voltage and the corresponding second output voltage.

Still another aspect of the present invention is to provide a DC conversion device operation method used in a DC conversion device. The DC conversion device operation method includes the steps outlined below. A first input current is received by a first input end of a first DC converter to generate a first output current at a first output end of the first DC converter, wherein the first input end has a first input voltage and the first output end is electrically coupled to a first energy storing element. A second input current is received by a second input end of a second DC converter to generate a second output current at a second output end of the second DC converter, wherein the second input end has a second input voltage and the second output end is electrically coupled to a second energy storing element. A voltage difference adjusting signal is generated by a voltage difference adjusting unit electrically coupled to the first DC converter and the second DC converter. A first control signal is generated to control the first DC converter by a first control unit. A second control signal is generated by a second control unit to control the second DC converter to balance the first output voltage and the second output voltage according to the voltage difference adjusting signal.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
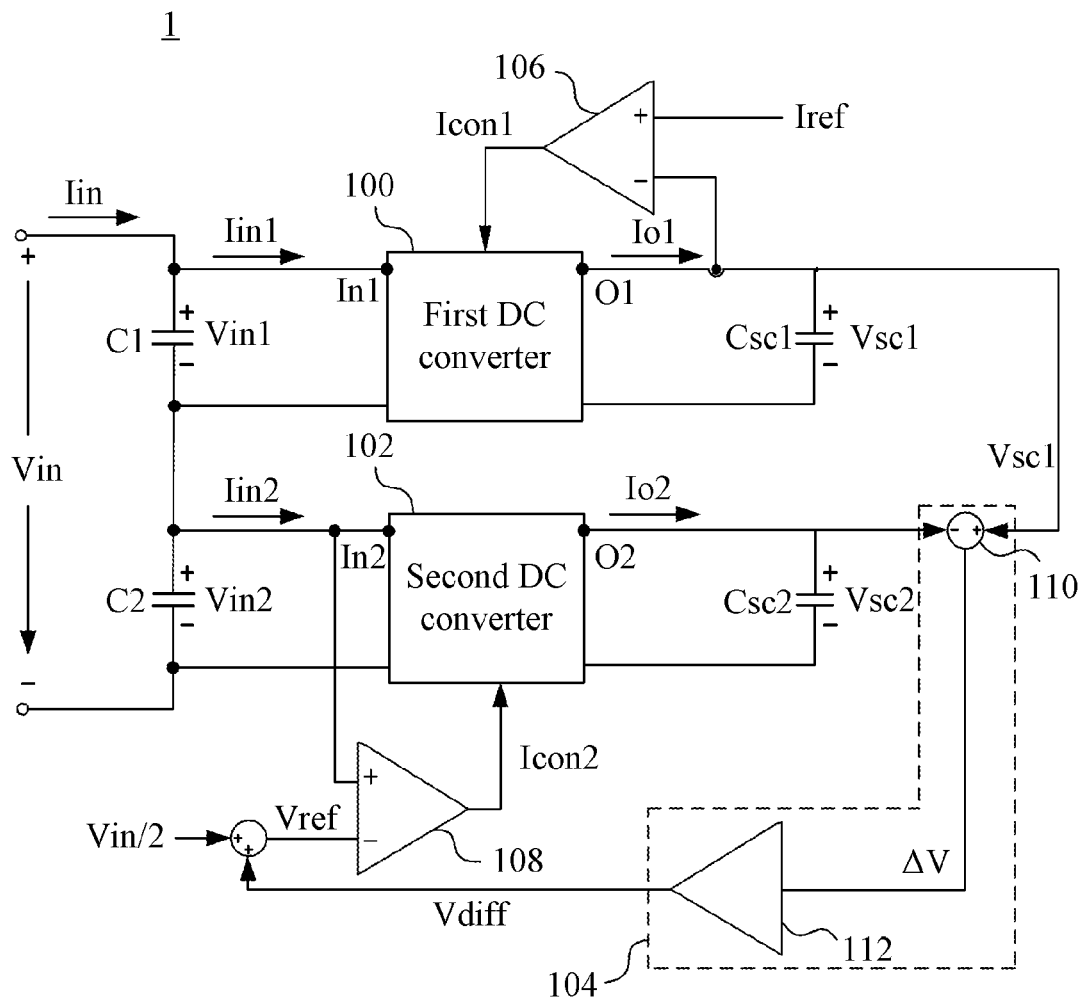
FIG. 1 is a circuit diagram of a DC conversion device in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Reference is now made to FIG. 1. FIG. 1 is a circuit diagram of a direct current (DC) conversion device 1 in an embodiment of the present invention. The DC conversion device 1 includes a first DC converter 100, a second DC converter 102, a voltage difference adjusting unit 104, a first control unit 106 and a second control unit 108.

The first DC converter 100 includes a first input end In1 and a first output end O1. The first input end In1 receives a first input current Iin1 and has a first input voltage Vin1. The first DC converter 100 generates a first output current Io1 at the first output end O1. In an embodiment, the first DC converter 100 is a two-level DC to DC converter or a multi-level DC to DC converter, such as a three-level DC to DC converter to convert the first input current Iin1 to the first output current Io1 to accomplish the conversion of DC electronic energy between different voltages.

The first output end O1 is electrically coupled to a first energy storing element Csc1. In an embodiment, the first energy storing element Csc1 is a capacitor, a super capacitor or other types of energy storing elements. The first output current Io1 generated at the first output end O1 can charge the first energy storing element Csc1. The first output end O1 outputs a first output voltage Vsc1 according to the charging result.

The second DC converter 102 includes a second input end In2 and a second output end O2. The second input end In2 receives a second input current Iin2 and has a second input voltage Vin2. The second DC converter 102 generates a second output current Io2 at the second output end O2. In an embodiment, the second DC converter 102 is a two-level DC to DC converter or a multi-level DC to DC converter, such as a three-level DC to DC converter to convert the second input current Iin2 to the second output current Io2 to accomplish the conversion of DC electronic energy between different voltages.

The second input end In2 is electrically coupled to the first input end In1 in series. The second output end O2 is electrically coupled to a second energy storing element Csc2. In an embodiment, the second energy storing element Csc2 is a capacitor, a super capacitor or other types of energy storing elements. The second output current Io2 generated at the second output end O2 can charge the second energy storing element Csc2. The second output end O2 has a second output voltage Vsc2 according to the charging result.

In an embodiment, the DC conversion device 1 further includes bus capacitors C1 and C2 electrically coupled in series. The first input end In1 and the second input end In2 of the first DC converter 100 and the second DC converter 102 are electrically coupled to the bus capacitors C1 and C2 respectively. In some embodiments, the DC conversion device 1 includes resistors electrically coupled in series or a series-connected combination of units in which a resistor and a capacitor are electrically coupled in parallel, and it may be coupled to the first input end In1 and the second input end In2 of the first DC converter 100 and the second DC converter 102 respectively. The present invention is not limited thereto.

The voltage difference adjusting unit 104 is electrically coupled to the first DC converter 100 and the second DC converter 102 to generate a voltage difference adjusting signal Vdiff. In the present embodiment, the voltage difference adjusting unit 104 further includes a voltage difference calculating unit 110 and an adjusting unit 112. The voltage difference calculating unit 110 receives the first output voltage Vsc1 and the second output voltage Vsc2 to calculate a difference value $\Delta V$. The adjusting unit 112 perform adjustment according to the difference value $\Delta V$ to generate the voltage difference adjusting signal Vdiff. So the voltage difference adjusting signal may be equal to or corresponding to the difference value $\Delta V$. However, the present invention is not limited thereto. In another embodiment, other configurations can be used to implement the voltage difference adjusting unit 104. In an embodiment, the adjusting unit 112 can be such as, but not limited to a proportional-integral-derivative (PID) controller. In an embodiment, the adjusting unit 112 can adjust corresponding parameters according to the charging and discharging status of the energy storing elements, such as the amount or the sign of the parameters. In an embodiment, the adjusting unit 112 can adjusts corresponding parameters according to the operation frequency of the converters in the system. The present invention is not limited thereto.

The first control unit 106 generates a first control signal Icon1 to control the first DC converter 100. In the present embodiment, the first control unit 106 is a current control unit to generate the first control signal Icon1 according to the first output current Io1 and a reference current value Iref to further control the first output current Io1 through a feedback mechanism. In the present embodiment, the reference current value Iref can be a given value. However, the present invention is not limited thereto.

The second control unit 108 generates a second control signal Icon2 to control the second DC converter 102 according to the voltage difference adjusting signal Vdiff to further realize the adjustment of the second input voltage Vin2 and the balance of the first output voltage Vsc1 and the second output voltage Vsc2. In the present embodiment, the second control unit 108 is a voltage control unit to generate the second control signal Icon2 according to the second input voltage Vin2 and the reference voltage value Vref to further control the operation of the second DC converter 102. In the present embodiment, the reference voltage value Vref is generated by a sum of a half of the total input voltage value Vin, which is Vin/2, and the voltage difference adjusting signal Vdiff. However, the present invention is not limited thereto. As a result, by using the design of the DC conversion device 1, the control of the currents and the voltages of the first DC converter 100 and the second DC converter 102 can keep the voltages of the first energy storing element Csc1 and the second energy storing element Csc2 equal or close to each other. The serial-connected input voltages' difference between the first DC converter 100 and the second DC converter 102 can also be limited in a small range determined by the difference of the charging consumption rate and the difference of the capacitor capacity. However, the present invention is not limited thereto.

Figure 2:
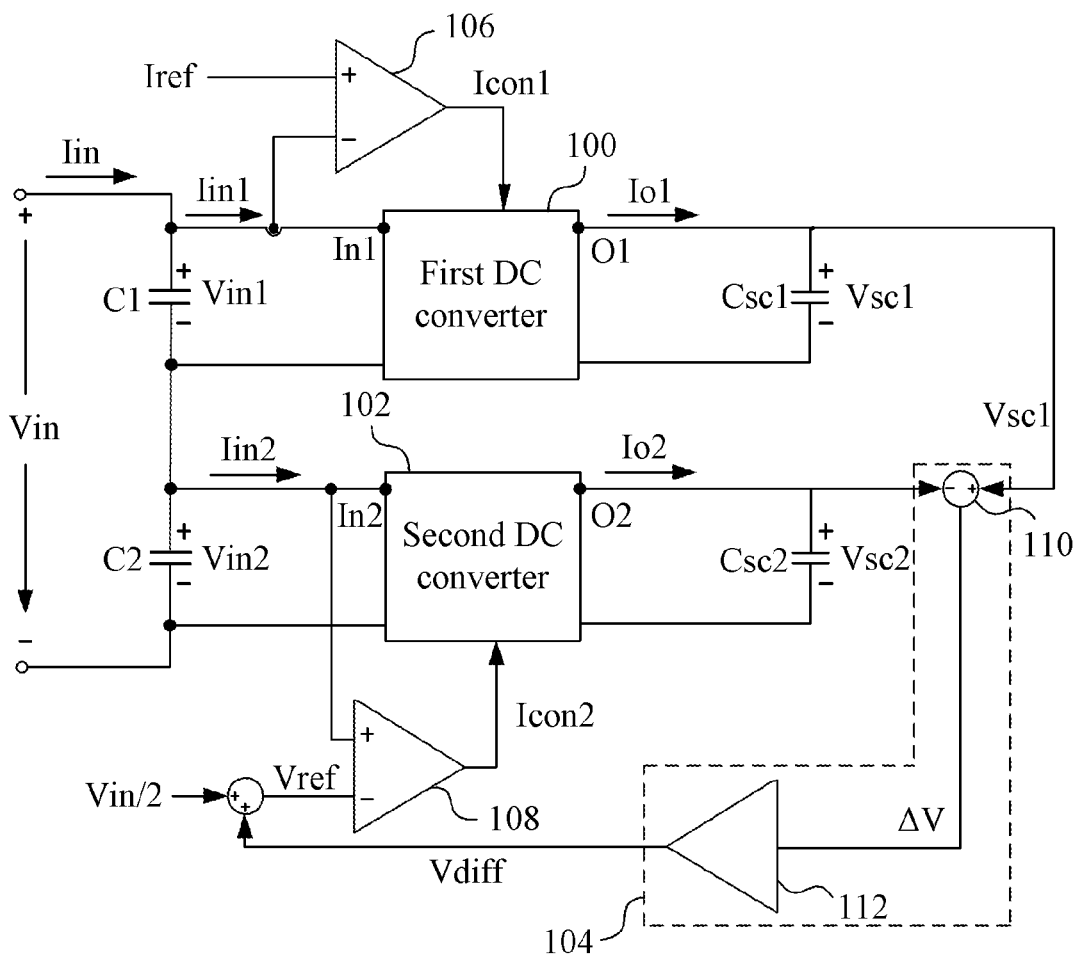
FIG. 2 is a circuit diagram of a DC conversion device in an embodiment of the present invention.

Reference is now made to FIG. 2. FIG. 2 is a circuit diagram of a DC conversion device 2 in an embodiment of the present invention. The components included in the DC conversion device 2 may be identical to the DC conversion device 1 illustrated in FIG. 1 and the components may include the first DC converter 100, the second DC converter 102, the voltage difference adjusting unit 104, the first control unit 106 and the second control unit 108. However, the present invention is not limited thereto. In the present embodiment, the first control unit 106 performs control according to the first input current Iin1.

As illustrated in FIG. 2, the first control unit 106 generates the first control signal Icon1 to control the first DC converter 100. In the present embodiment, the first control unit 106 is a current control unit to generate the first control signal Icon1 according to the first input current Iin1 and a reference current value Iref. However, the present invention is not limited thereto. The second control unit 108 may be identical to that illustrated in FIG. 1. In the present embodiment, the reference current value Iref can be a given value, but the present invention is not limited thereto.

As a result, by using the close loop control of the first control unit 106 and the close loop control of the second control unit 108, the input voltage under the stable operation of the first DC converter 100 and the input voltage under the stable operation of the second DC converter 102 which is connected in series with the first DC converter 100 in the input side and the voltages of the first energy storing element Csc1 and the second energy storing element Csc2 can all be controlled in a stable manner.

Figure 3:
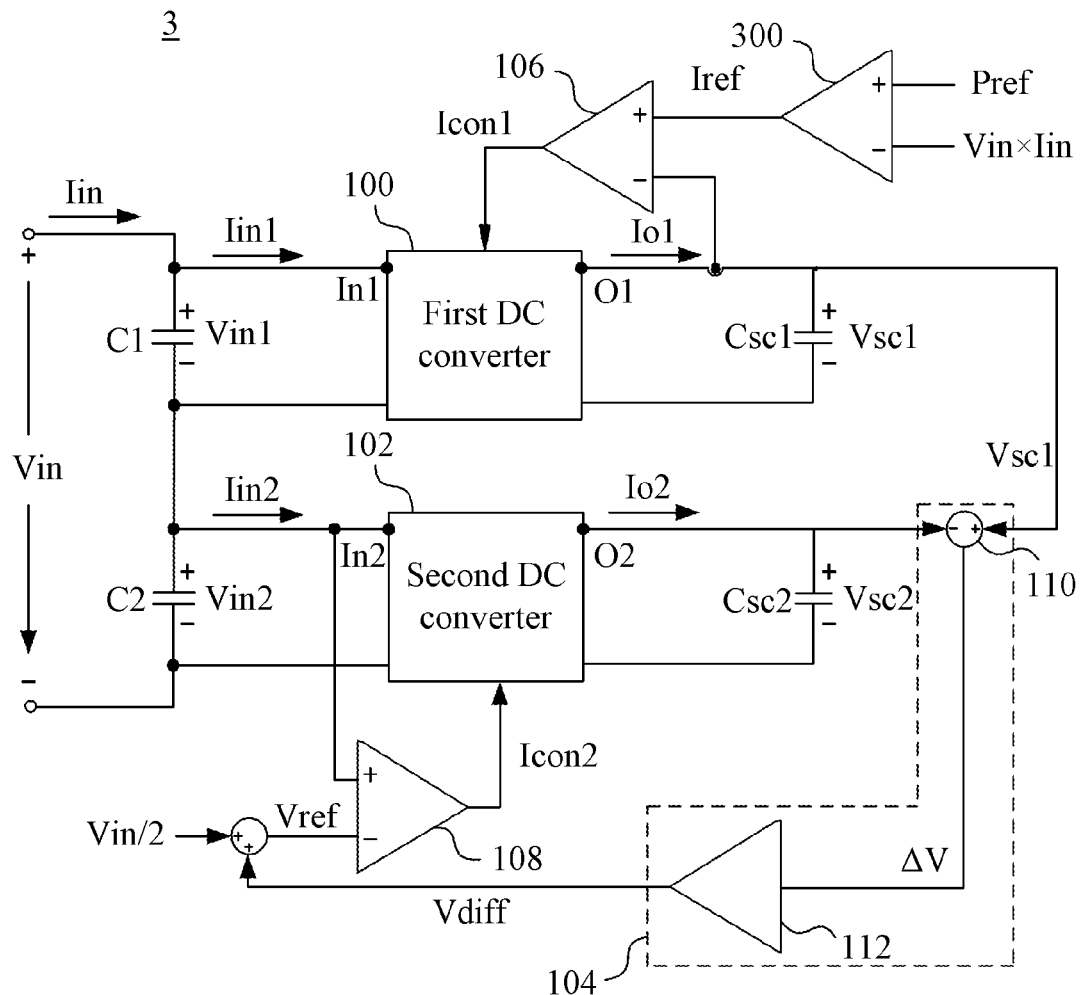
FIG. 3 is a circuit diagram of a DC conversion device in an embodiment of the present invention.

Reference is now made to FIG. 3. FIG. 3 is a circuit diagram of a DC conversion device 3 in an embodiment of the present invention. The components included in the DC conversion device 3 may be identical to the DC conversion device 1 illustrated in FIG. 1 and the components may include the first DC converter 100, the second DC converter 102, the voltage difference adjusting unit 104, the first control unit 106 and the second control unit 108. However, the present invention is not limited thereto. In the present embodiment, the DC conversion device 3 may further include a power adjusting unit 300.

In an embodiment, the input of the reference current value Iref can be given according to the requirement of the operation of the circuit system by the control loop of the DC conversion device 3, such as but not limited to a total input power value. As illustrated in FIG. 3, the power adjusting unit 300 receives a reference power value Pref and the total input power value, wherein the total input power value is a product of the total input voltage value Vin and the total input current value Iin, and the reference current value Iref is generated according to the reference power value Pref and the total input power value. However, the present invention is not limited thereto. The first control unit 106 can generate the first control signal Icon1 according to the first output current Io1 and the reference current value Iref. The second control unit 108 can be identical to that illustrated in FIG. 1.

Figure 4:
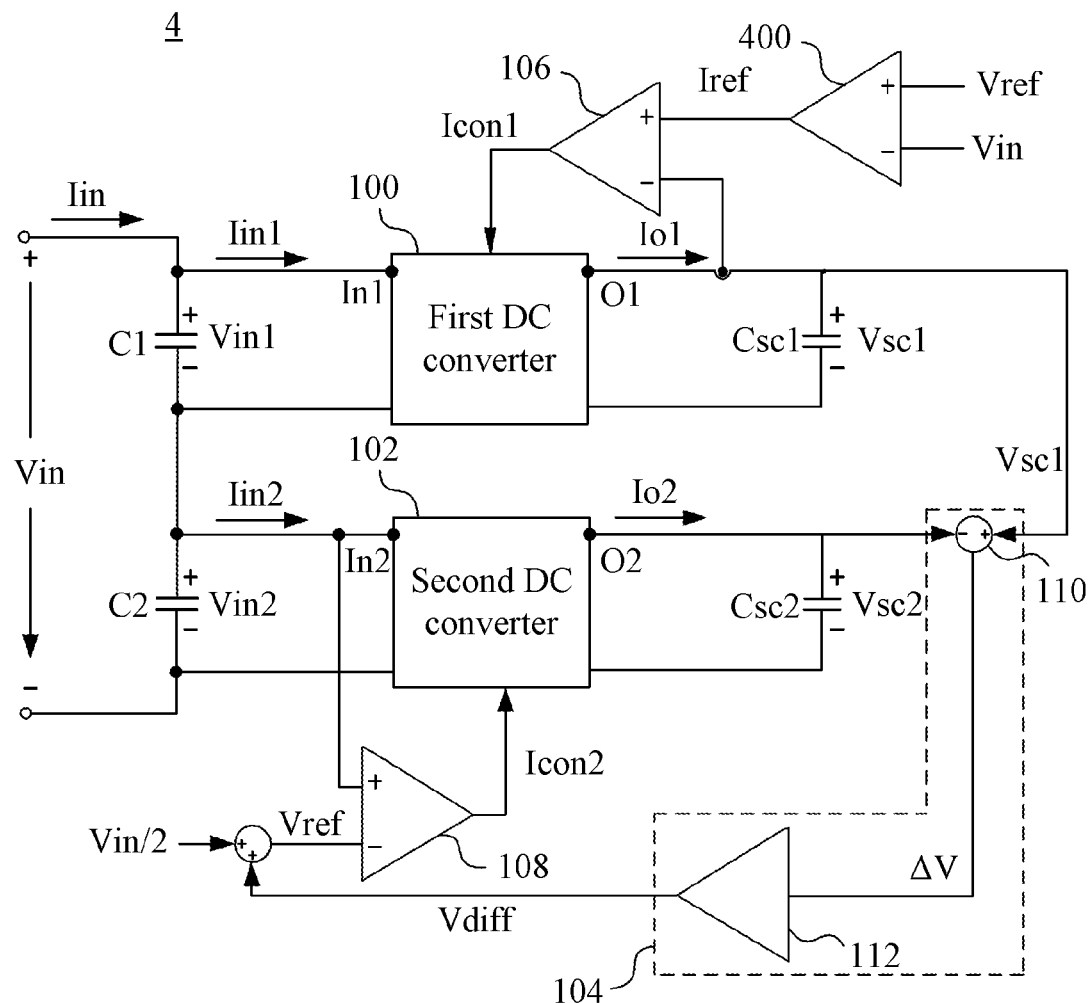
FIG. 4 is a circuit diagram of a DC conversion device in an embodiment of the present invention.

Reference is now made to FIG. 4. FIG. 4 is a circuit diagram of a DC conversion device 4 in an embodiment of the present invention. The components included in the DC conversion device 4 may be identical to the DC conversion device 1 illustrated in FIG. 1 and the components may include the first DC converter 100, the second DC converter 102, the voltage difference adjusting unit 104, the first control unit 106 and the second control unit 108. However, the present invention is not limited thereto. In the present embodiment, the DC conversion device 4 may further include a voltage adjusting unit 400.

In an embodiment, the input of the reference current value Iref can be given according to the requirement of the operation of the circuit system by the control loop of the DC conversion device 4, such as but not limited to a total input voltage value Vin. As illustrated in FIG. 4, the voltage adjusting unit 400 receives a reference voltage value Vref and the total input voltage value Vin, and the reference current value Iref is generated according to the reference voltage value Vref and the total input voltage value Vin. However, the present invention is not limited thereto. The first control unit 106 can generate the first control signal Icon1 according to the first output current Io1 and the reference current value Iref. The second control unit 108 can be identical to that illustrated in FIG. 1.

Figure 5:
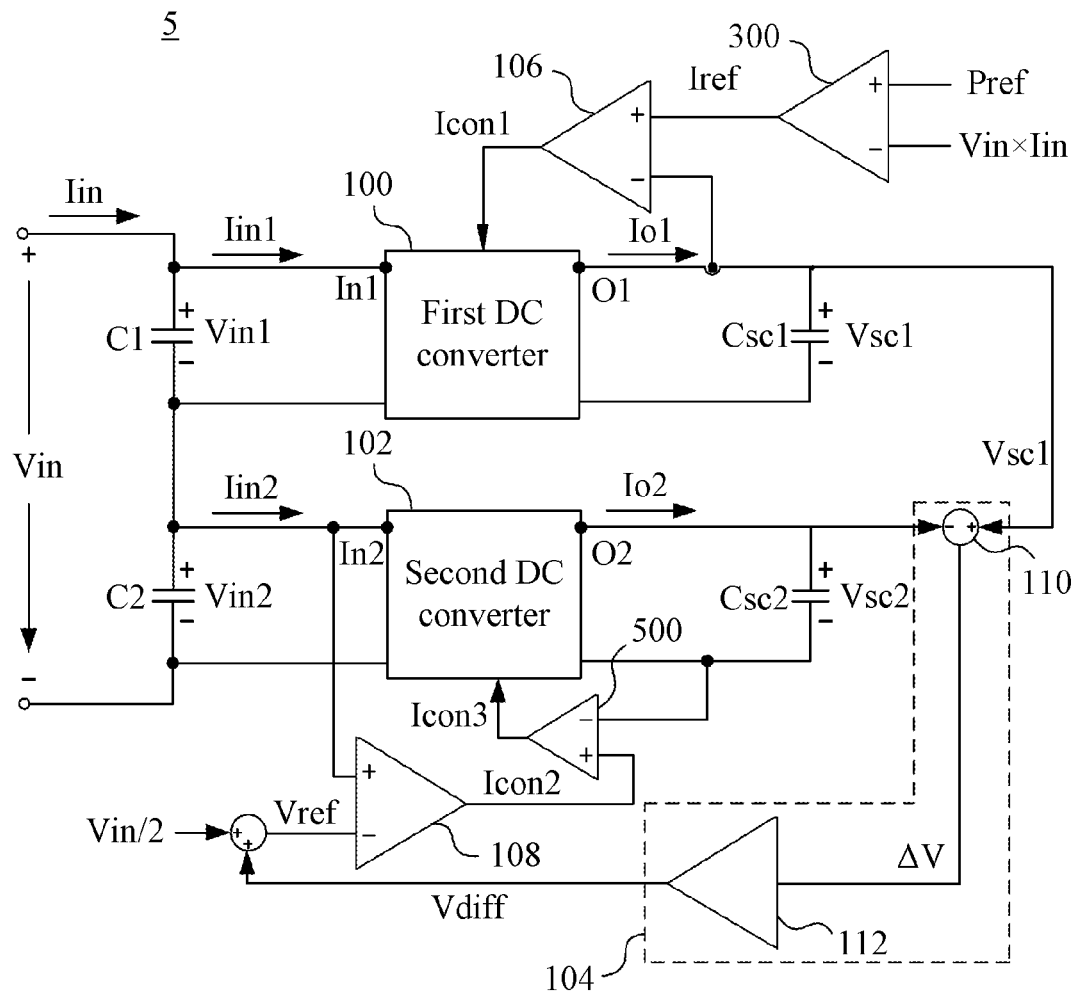
FIG. 5 is a circuit diagram of a DC conversion device in an embodiment of the present invention.

Reference is now made to FIG. 5. FIG. 5 is a circuit diagram of a DC conversion device 5 in an embodiment of the present invention. The components included in the DC conversion device 5 may be identical to the DC conversion device 3 illustrated in FIG. 3 and the components may include the first DC converter 100, the second DC converter 102, the voltage difference adjusting unit 104, the first control unit 106, the second control unit 108 and the power adjusting unit 300. However, the present invention is not limited thereto. In the present embodiment, the DC conversion device 5 may further include a current adjusting unit 500.

In the present embodiment, besides the control of voltage feedback loop, for example, based on the second input voltage Vin2 by the second control unit 108, the current feedback loop control can also be used to achieve better control performance, for example, based on the input current or the output current. As illustrated in FIG. 5 the current adjusting unit 500 receives the second output current Io2 and the second control signal Icon2 to generate a third control signal Icon3 accordingly. However, the present invention is not limited thereto. The operation of the first control unit 106 can be identical to that illustrated in FIG. 3.

In another embodiment, the current adjusting unit 500 receives the second input current Iin2 and the second control signal Icon2 to generate the third control signal Icon3. However, the present invention is not limited thereto.

It is appreciated that the current adjusting unit 500 can be used in the embodiments mentioned above, and is not limited to the embodiment illustrated in FIG. 5.

Figure 6:
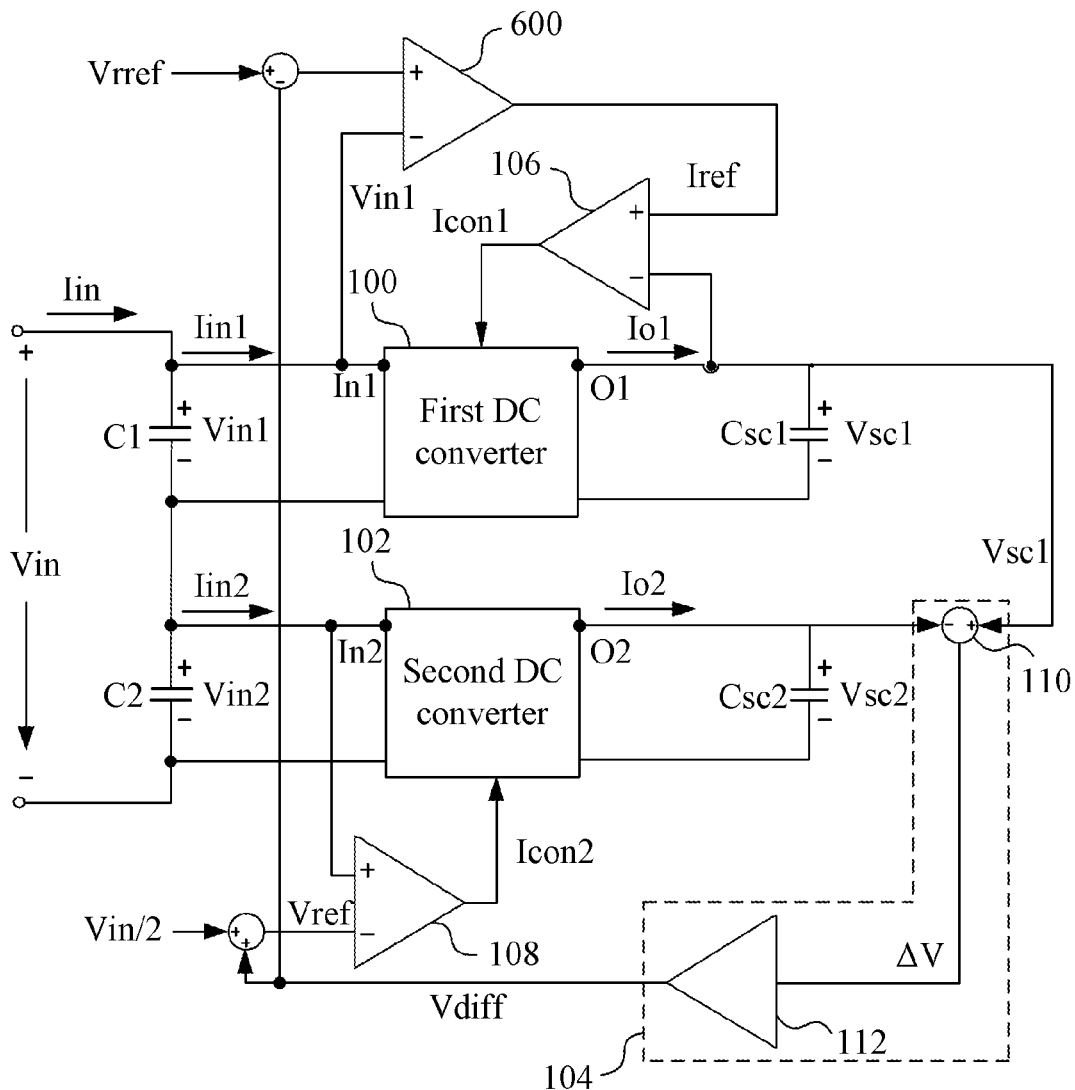
FIG. 6 is a circuit diagram of a DC conversion device in an embodiment of the present invention.

Reference is now made to FIG. 6. FIG. 6 is a circuit diagram of a DC conversion device 6 in an embodiment of the present invention. The components included in the DC conversion device 6 may be identical to the DC conversion device 1 illustrated in FIG. 1 and the components may include the first DC converter 100, the second DC converter 102, the voltage difference adjusting unit 104, the first control unit 106 and the second control unit 108. However, the present invention is not limited thereto. In the present embodiment, the DC conversion device 6 may further include a voltage adjusting unit 600.

In an embodiment, the voltage adjusting unit 600 uses the first input voltage Vin1 to control in a feedback mechanism and uses a sum of an adjusting reference voltage Vrref which is close to a half of the total input voltage value (Vin/2) and a negative value of the voltage difference signal Vdiff (i.e., −Vdiff) as the reference given signal of the voltage control loop to generate the reference current value Iref. However, the present invention is not limited thereto. The first control unit 106 can generate the first control signal Icon1 according to a difference between the first output current Io1 and the reference current value Iref. The second control unit 108 can be identical to that illustrated in FIG. 1.

Figure 7:
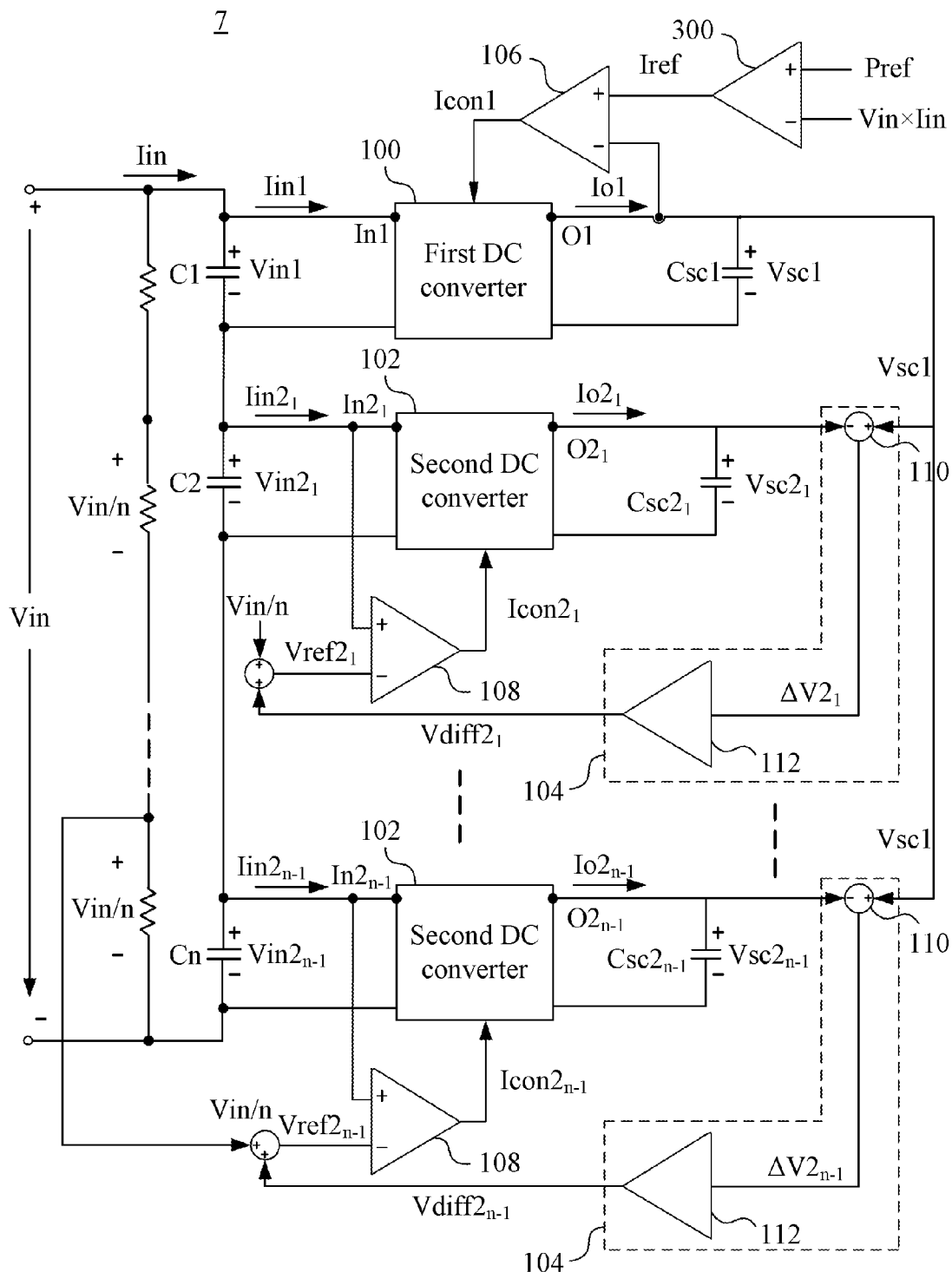
FIG. 7 is a circuit diagram of a DC conversion device in an embodiment of the present invention.

Reference is now made to FIG. 7. FIG. 7 is a circuit diagram of a DC conversion device 7 in an embodiment of the present invention. The components included in the DC conversion device 7 may be identical to the DC conversion device 1 illustrated in FIG. 1 and the components may include the first DC converter 100 and the first control unit 106. However, in the present embodiment, the DC conversion device 7 includes n-1 second DC converters 102, n-1 voltage difference adjusting units 104 and n-1 second control units 108. However, the present invention is not limited thereto.

As illustrated in FIG. 7, the first output voltage Vsc1 at the first output end O1 of the first DC converter 100 can act as a reference voltage to calculate the voltage differences between the energy storing elements of different DC converters. However, the present invention is not limited thereto. Other DC converters (the group of second converters) can add 1/n of the total input voltage value Vin (i.e. Vin/n) to the voltage difference adjusting signals Vdiff2$_1$ to Vdiff2$_{n-1}$ so as to get the voltage control given signals Vref2$_1$ to Vref2$_{n-1}$. For example, the second DC converter 102 corresponding to the bus capacitor Cn can add Vin/n to the voltage difference adjusting signal Vdiff2$_{n-1}$ as the voltage control given signal Vref2$_{n-1}$.

Figure 8:
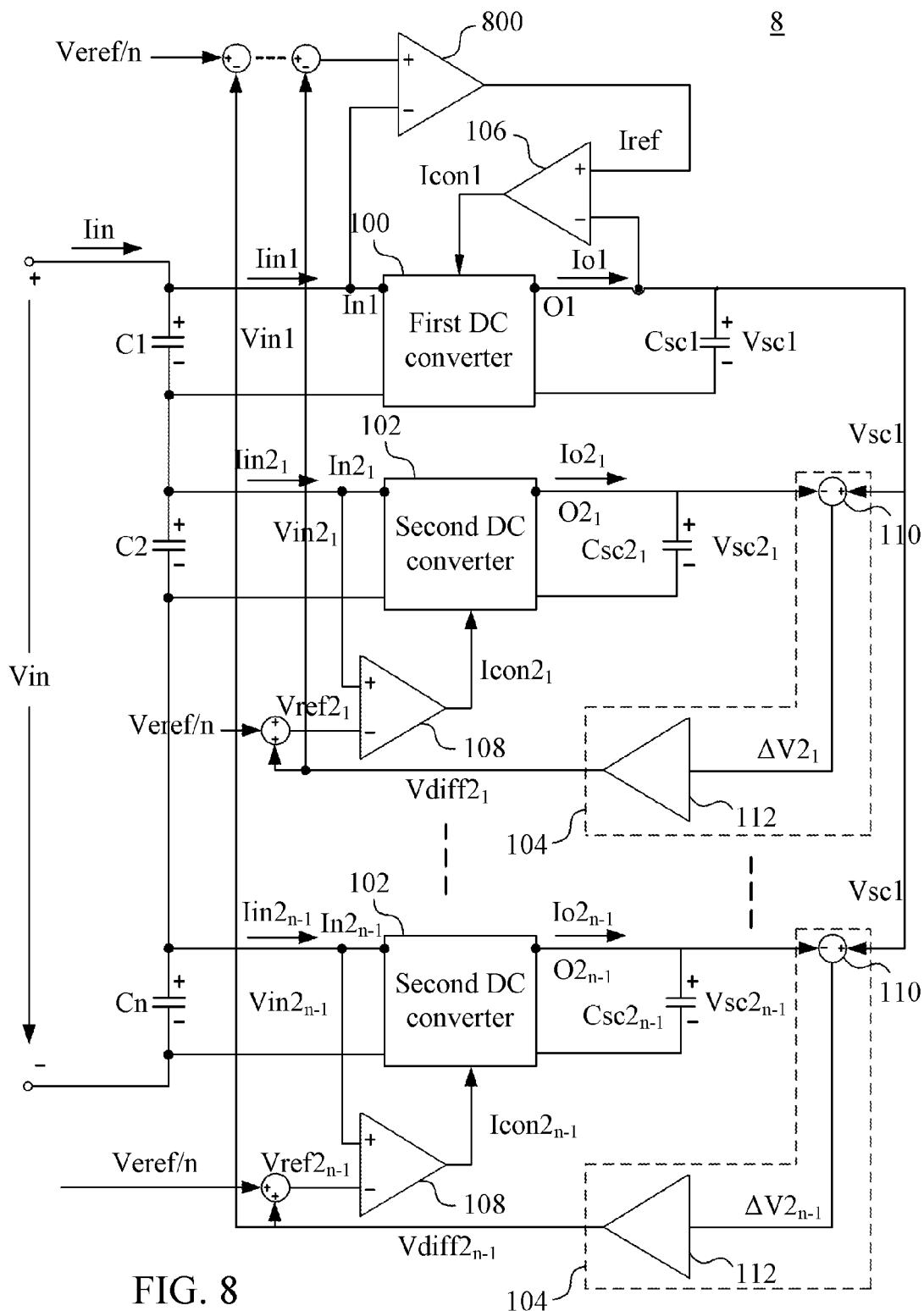
FIG. 8 is a circuit diagram of a DC conversion device in an embodiment of the present invention.

Reference is now made to FIG. 8. FIG. 8 is a circuit diagram of a DC conversion device 8 in an embodiment of the present invention. The components included in the DC conversion device 8 may be identical to the DC conversion device 1 illustrated in FIG. 1 and the components may include the first DC converter 100 and the first control unit 106. In the present embodiment, the DC conversion device 8 includes n-1 second DC converters 102, n-1 voltage difference adjusting units 104 and n-1 second control units 108. However, the present invention is not limited thereto.

As illustrated in FIG. 8, the first output voltage Vsc1 at the first output end O1 of the first DC converter 100 can act as a reference voltage to calculate the voltage differences between the energy storing elements of different DC converters. However, the present invention is not limited thereto. Other DC converters (the second converters) can add 1/n of the total voltage expected value Veref (i.e. Veref/n) to the voltage difference adjusting signals Vdiff2$_1$ to Vdiff2$_{n-1}$ so as to get the voltage control given signals Vref2$_1$ to Vref2$_{n-1}$. However, the present invention is not limited thereto. The first DC converter 100 corresponding to the reference voltage can use input voltage to perform controlling and the voltage can be given as 1/n of the total voltage expected value Veref subtracting the voltage difference adjusting signals Vdiff2$_1$ to Vdiff2$_{n-1}$ of all the other converters. However, the present invention is not limited thereto. In the present embodiment, the DC conversion device 8 may further include a voltage adjusting unit 800.

In an embodiment, the voltage adjusting unit 800 performs a feedback controlling through the first input voltage Vin1 and uses 1/n of the total voltage expected value Veref subtracting the voltage difference adjusting signals Vdiff2$_1$ to Vdiff2$_{n-1}$ of all the other converters so as to get the reference given signal of the voltage control loop to generate the reference current value Iref. However, the present invention is not limited thereto. The first control unit 106 generates the first control signal Icon1 according to the difference value between the first output current Io1 and the reference current value Iref. Besides, the first control unit 106 in FIG. 8 can be omitted such that the first control signal Icon1 is directly outputted by the voltage adjusting unit 800.

Actually, any one of a multiple of converters can be selected as the first DC converter 100 such that the other converters become the second DC converters 102. The configuration is not limited to those illustrated in FIG. 1 to FIG. 8.

Figure 9:
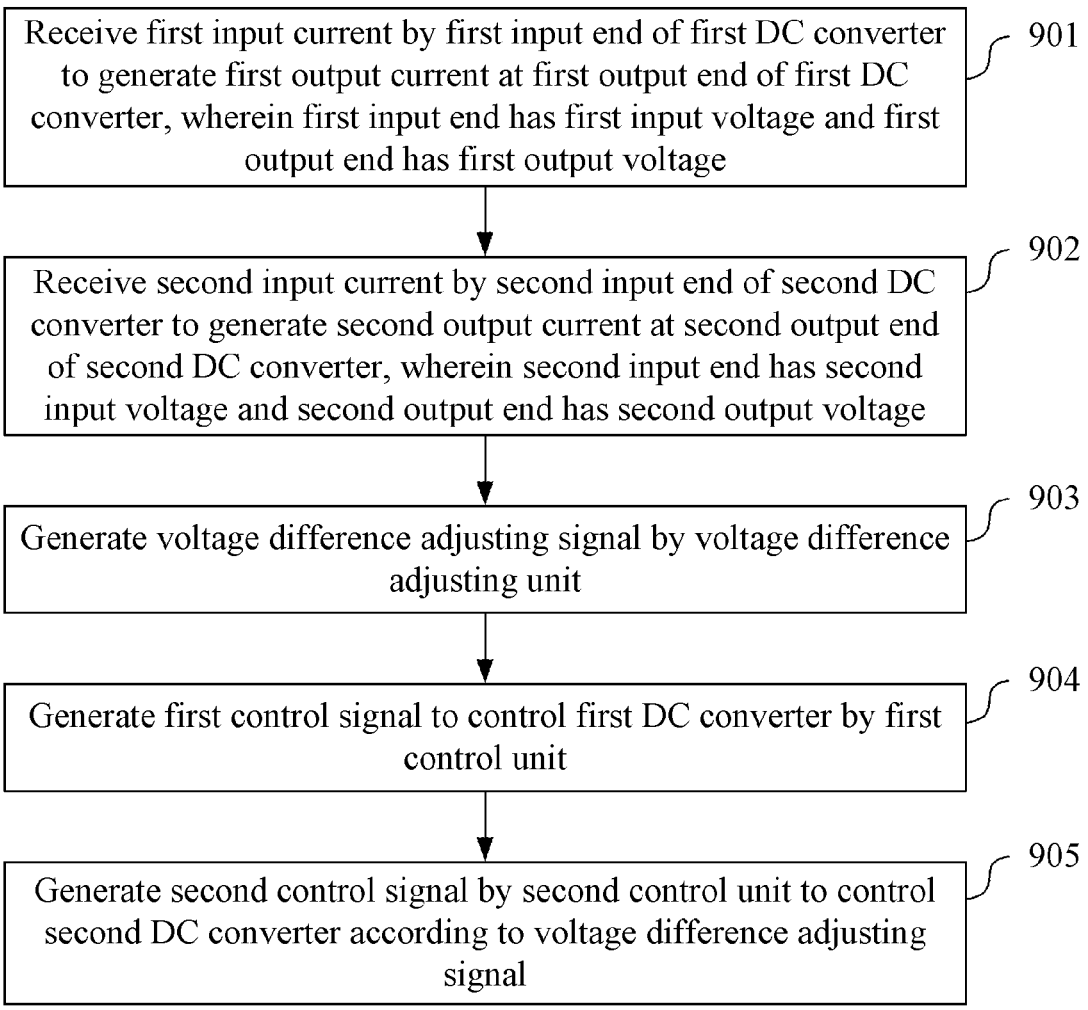
FIG. 9 is a flow chart of a DC conversion device operation method in an embodiment of the present invention.

Reference is now made to FIG. 9. FIG. 9 is a flow chart of a DC conversion device operation method 900 in an embodiment of the present invention. The DC conversion device operation method 900 can be used in each of the DC conversion devices illustrated in FIG. 1 to FIG. 8. The following description is made by using the DC conversion device 1 illustrated in FIG. 1 as an example. However, unless the sequence of the steps is expressly indicated, the sequence of the steps is interchangeable, and all or part of the steps may be simultaneously, partially simultaneously, or sequentially performed.

In step 901, the first input current Iin1 is received by the first input end In1 of the first DC converter 100 to generate the first output current Io1 at the first output end O1 of the first DC converter 100, wherein the first input end In1 has the first input voltage Vin1 and the first output end O1 has the first output voltage Vo1. The first DC converter 100 is electrically coupled to the first energy storing element Csc1.

In step 902, the second input current Iin2 is received by the second input end In2 of the second DC converter 102 to generate the second output current Io2 at the second output end O2 of the second DC converter 102, wherein the second input end In2 has the second input voltage Vin2 and the second output end O2 has the second output voltage Vo2. The second DC converter 102 is electrically coupled to the second energy storing element Csc2.

In step 903, the voltage difference adjusting signal Vdiff is generated by the voltage difference adjusting unit 104 which is electrically coupled to the first DC converter 100 and the second DC converter 102. For example, Vdiff may be equal or corresponding to Vsc1 minus Vsc2 for the second converter in FIG. 1.

In step 904, the first control signal Icon1 is generated to control the first DC converter 100 by the first control unit 106. For example, Icon1 may be equal or corresponding to Iref minus Io1.

In step 905, the second control signal Icon2 is generated by the second control unit 108 to control the second DC converter 102 according to the voltage difference adjusting signal Vdiff. For example, Vref may be equal to Vdiff plus Vin/2, and Icon2 may be equal to or corresponding to Vin2 minus Vref.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A direct current (DC) conversion device comprising:
   a first DC converter comprising a first input end to receive a first input current and a first input voltage, and a first output end to generate a first output current and a first output voltage, wherein the first output end is electrically coupled to a first energy storing element;
   a second DC converter comprising a second input end to receive a second input current and a second input voltage, and a second output end to generate a second output current and a second output voltage, wherein the second output end is electrically coupled to a second energy storing element;
a voltage difference adjusting unit electrically coupled to the first DC converter and the second DC converter to generate a voltage difference adjusting signal;
a first control unit to generate a first control signal to control the first DC converter;
a second control unit to generate a second control signal to control the second DC converter to balance the first output voltage and the second output voltage according to the voltage difference adjusting signal; and
wherein the first output voltage and the second output voltage are DC voltages, and the voltage difference adjusting signal is dependent on voltage difference between the first output voltage and the second output voltage.

2. The DC conversion device of claim 1, wherein the first control unit generates the first control signal according to a reference current value and one of the first input current and the first output current.

3. The DC conversion device of claim 2, wherein the first control unit further comprises a first voltage adjusting unit to generate the reference current value according to the first input voltage, the voltage difference adjusting signal and an adjusting reference voltage.

4. The DC conversion device of claim 2, wherein the first control unit further comprises a power adjusting unit to generate the reference current value according to a total input power value and a reference power value.

5. The DC conversion device of claim 2, wherein the first control unit further comprises a second voltage adjusting unit to generate the reference current value according to a total input voltage value and a total input voltage reference value.

6. The DC conversion device of claim 1, wherein the second control unit generates the second control signal according to the second input voltage and a reference voltage value, wherein the reference voltage value is generated according to the voltage difference adjusting signal.

7. The DC conversion device of claim 6, wherein the reference voltage value is generated according to a sum of a half of a total input voltage value and the voltage difference adjusting signal.

8. The DC conversion device of claim 1, wherein the second control unit further comprises a current adjusting unit to generate a third control signal to control the second DC converter according to the second control signal and one of the second input current and the second output current.

9. The DC conversion device of claim 1, wherein each of the first DC converter and the second DC converter is a two-level converter or a multi-level DC converter.

10. A DC conversion device comprising:
a first DC converter comprising a first input end to receive a first input current and a first input voltage, and a first output end to generate a first output current and a first output voltage, wherein the first output end is electrically coupled to a first energy storing element;
a plurality of second DC converters, wherein any one of the second DC converters comprises a second input end to receive a second input current and a second input voltage, and a second output end to generate a second output current and a second output voltage, wherein the second input ends of the plurality of second DC converters are electrically coupled to the first input end in series, and the second output ends of the plurality of second DC converters are electrically coupled to a plurality of second energy storing elements respectively;
a plurality of voltage difference adjusting units electrically coupled to the first DC converter and the plurality of second DC converters to generate a plurality of voltage difference adjusting signals;
a first control unit to generate a first control signal to control the first DC converter;
a plurality of second control units, wherein any one of the second control units generates a corresponding second control signal to control the corresponding one of the second DC converters according to the corresponding one of the voltage difference adjusting signals to balance the first output voltage and the corresponding second output voltage; and
wherein the first output voltage and the second output voltage are DC voltages, and the voltage difference adjusting signals are dependent on voltage differences between the first output voltage and the corresponding second output voltage.

11. The DC conversion device of claim 10, wherein the first control unit generates the first control signal according to a reference current value and one of the first input current and the first output current.

12. The DC conversion device of claim 11, wherein the first control unit further generates the reference current value according to the plurality of voltage difference adjusting signals and a total voltage expected value.

13. The DC conversion device of claim 10, wherein the one of the second control units generates the corresponding second control signal to control the corresponding one of the second DC converters according to a sum of the corresponding one of the voltage difference adjusting signals and a fraction of a total input voltage value.

14. The DC conversion device of claim 13, wherein the fraction of the total input voltage value is equal to the total input voltage value divided by a total number of the first DC converter and the plurality of second DC converters.

15. A DC conversion device operation method used in a DC conversion device, wherein the DC conversion device operation method comprises:
receiving a first input current by a first input end of a first DC converter to generate a first output current at a first output end of the first DC converter, wherein the first input end has a first input voltage and the first output end has a first output voltage and is electrically coupled to a first energy storing element, wherein the first output voltage is a DC voltage;
receiving a second input current by a second input end of a second DC converter to generate a second output current at a second output end of the second DC converter, wherein the second input end has a second input voltage and the second output end has a second output voltage and is electrically coupled to a second energy storing element, wherein the second output voltage is a DC voltage;
generating a voltage difference adjusting signal by a voltage difference adjusting unit electrically coupled to the first DC converter and the second DC converter, wherein the voltage difference adjusting signal is dependent on voltage difference between the first output voltage and the second output voltage;
generating a first control signal to control the first DC converter by a first control unit; and
generating a second control signal by a second control unit to control the second DC converter according to the voltage difference adjusting signal to balance the first output voltage and the second output voltage.

16. The DC conversion device operation method of claim 15, further comprising generating the first control signal by the first control unit according to a reference current value and one of the first input current and the first output current.

17. The DC conversion device operation method of claim 16, further comprising generating the reference current value by the first control unit according to the first input voltage, the voltage difference adjusting signal and an adjusting reference voltage; or generating the reference current value by the first control unit according to a total input power value and a reference power value; or generating the reference current value by the first control unit according to a total input voltage value and a total input voltage reference value.

18. The DC conversion device operation method of claim 15, further comprising generating the second control signal by the second control unit according to the second input voltage and a reference voltage value, wherein the reference voltage value is generated according to the voltage difference adjusting signal.

19. The DC conversion device operation method of claim 18, wherein the reference voltage value is generated according to a sum of the voltage difference adjusting signal and a fraction of a total input voltage value.

20. The DC conversion device operation method of claim 19, wherein the fraction of the total input power value is equal to the total input voltage value divided by a total number of the first DC converter and the second DC converter.

\* \* \* \* \*